(No Model.) 3 Sheets—Sheet 1.
R. McWHIRTER & E. S. SCHEBLE.
APPARATUS FOR COUPLING AND UNCOUPLING CARS.
No. 431,850. Patented July 8, 1890.
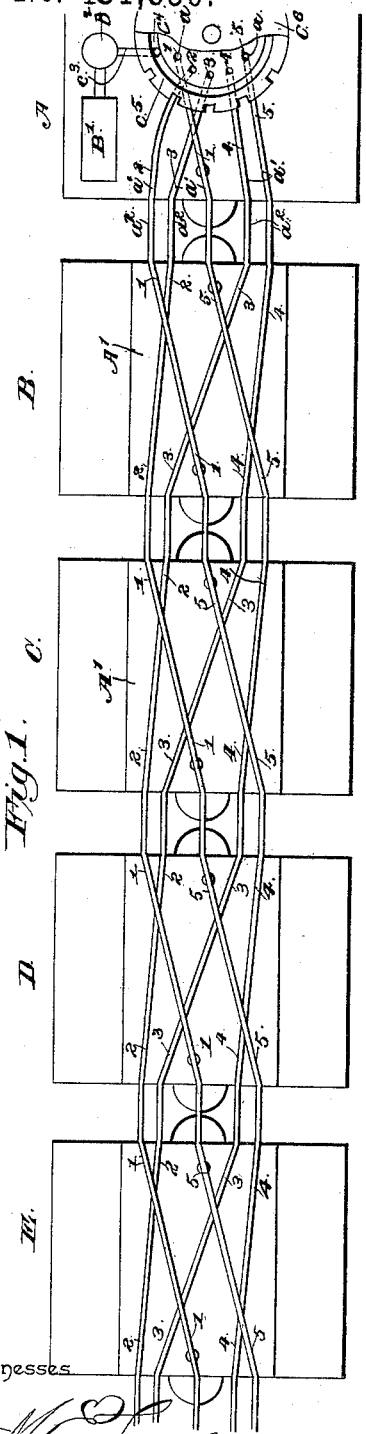
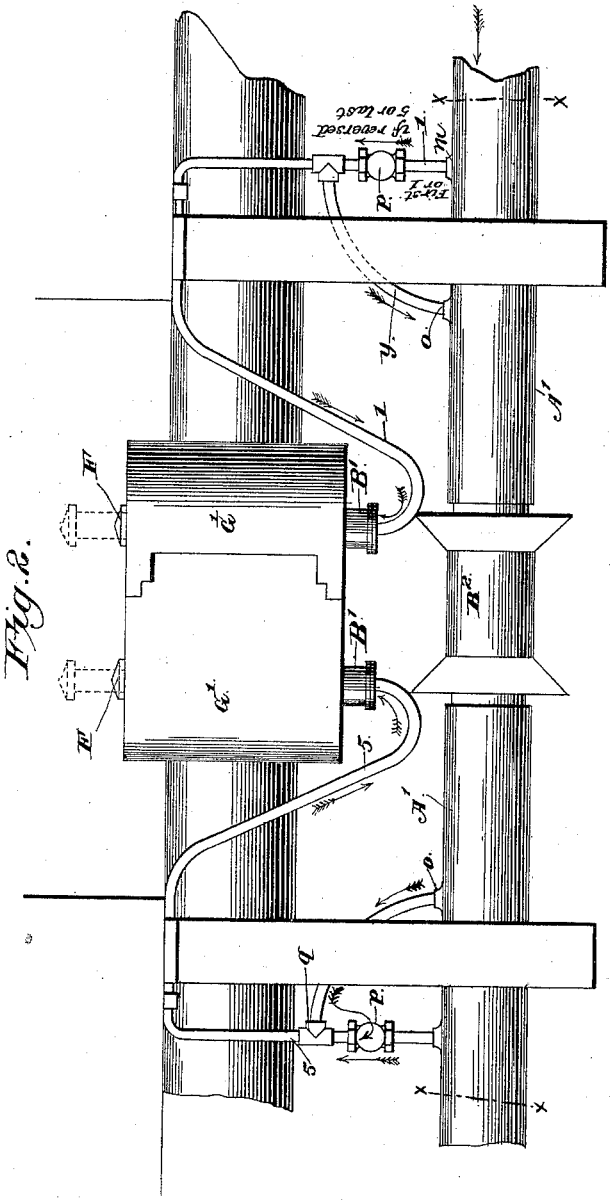
Witnesses
M. Fowler
D. W. Graham
Inventors
Robert Mc. Whirter and
Eugene S. Scheble (No Model.) 3 Sheets—Sheet 2.
R. McWHIRTER & E. S. SCHEBLE.
APPARATUS FOR COUPLING AND UNCOUPLING CARS.
No. 431,850. Patented July 8, 1890.
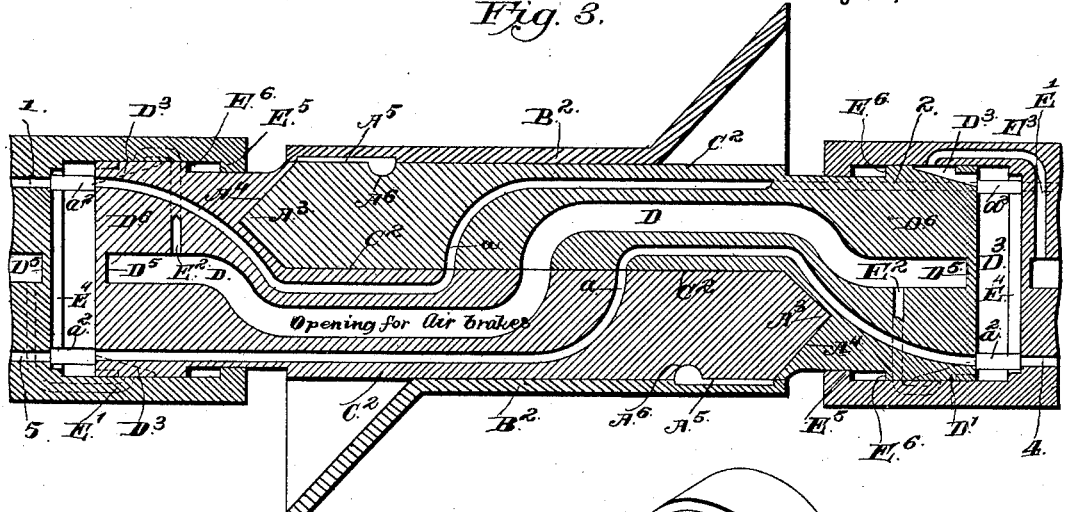
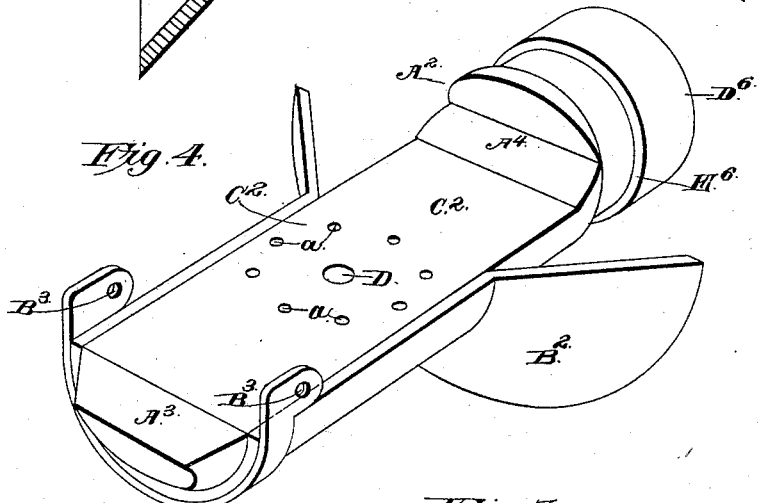
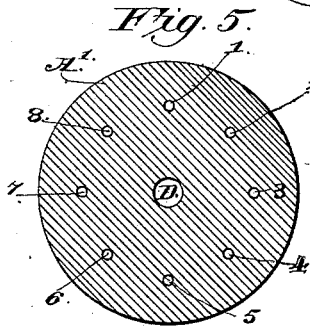
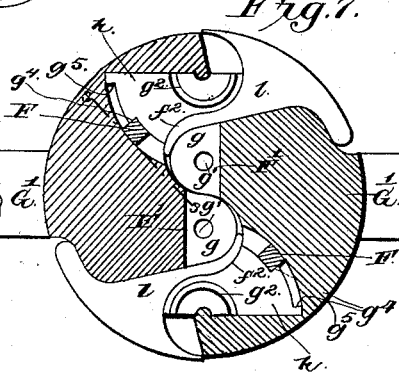
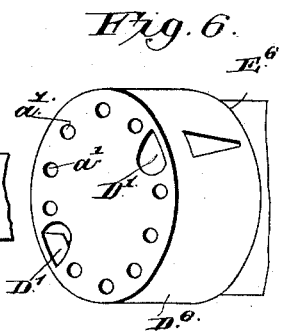
Witnesses
M E Fowler
J W Graham
Inventors
Robert McWhirter and
Eugene S. Scheble (No Model.) 3 Sheets—Sheet 3.
R. McWHIRTER & E. S. SCHEBLE.
APPARATUS FOR COUPLING AND UNCOUPLING CARS.
No. 431,850. Patented July 8, 1890.
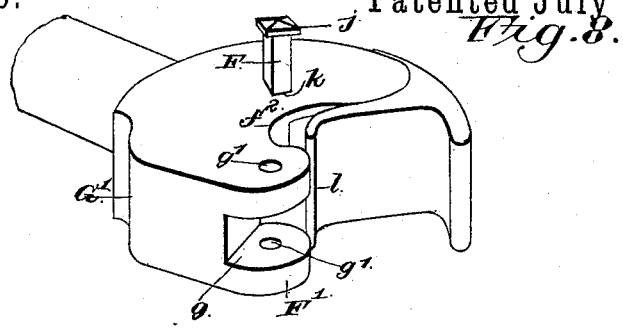
Fig. 8.
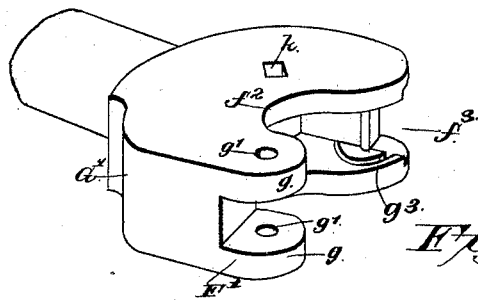
Fig. 9.
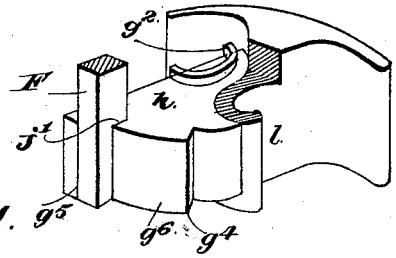
Fig. 10.
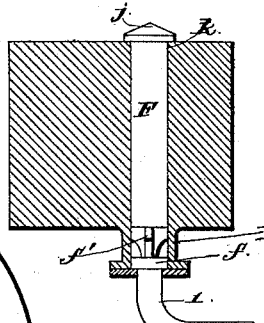
Fig. 11.
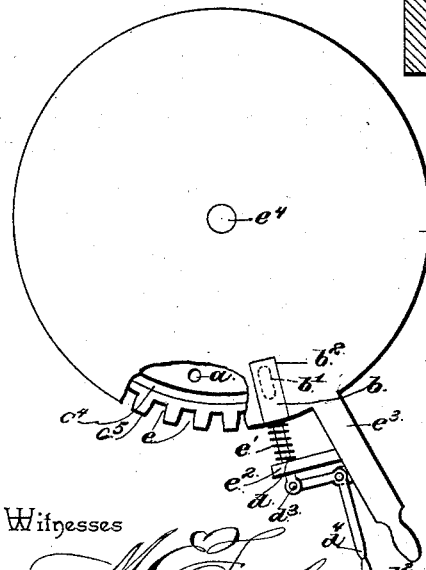
Fig. 12.
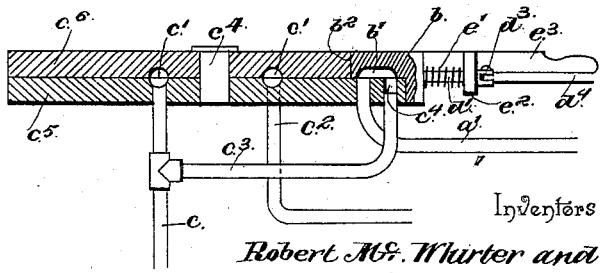
Fig. 13.
Fig. 14.
Witnesses
M. Fowler
J. W. Graham
Inventors
Robert McWhirter and
Eugene S. Scheble
THE NORRIS PETERS CO., PHOTO-LITHO., WASHINGTON, D. C.

UNITED STATES PATENT OFFICE.

ROBERT McWHIRTER AND EUGENE S. SCHEBLE, OF BELTON, TEXAS.

APPARATUS FOR COUPLING AND UNCOUPLING CARS.

SPECIFICATION forming part of Letters Patent No. 431,850, dated July 8, 1890.

Application filed March 26, 1890. Serial No. 345,393. (No model.)

*To all whom it may concern:*

Be it known that we, ROBERT MCWHIRTER and EUGENE S. SCHEBLE, citizens of the United States of America, residing at Belton, in the county of Bell and State of Texas, have invented certain new and useful Improvements in Apparatus for Coupling and Uncoupling Cars; and we do hereby declare the following to be a full, clear, and exact description of the invention, such as will enable others skilled in the art to which it appertains to make and use the same.

Our invention relates to means and apparatus for coupling and uncoupling by compressed air cars of movable trains, and has for its object to provide a coupling of such construction as will permit the coupling and uncoupling of the cars to be effected by the engineer and to be entirely and at all times under his perfect control.

Our invention is clearly and definitely illustrated by the accompanying drawings, wherein—

Figure 1 is a diagrammatic view of a train, consisting of four cars and a locomotive, showing our peculiar, new, and novel system of arrangement of openings, in which compressed gases may be forced to a designated point. Fig. 2 is a side elevation of our coupling devices between two cars after they have come together, showing check-valves in tubes 1, or first, and 5, or last, in their respective places leading to the air-cylinders in the car-couplers. Fig. 3 is a longitudinal section of our pipe-coupling, showing air-openings registering one with another. Fig. 4 is a perspective view of coupling-head of pipe A′, showing a concentric arrangement of air-holes around a larger hole designed for the passage of compressed air to the car-brakes. Fig. 5 is a cross-section of pipe A′ on the line $x\,x$ of Fig. 2, showing the construction of air-openings leading to the car-couplers and car-brakes. Fig. 6 is a perspective view of rear end of pipe-head $A^2$ of the pipe-coupling A′, showing openings or ports D′ for the passage of compressed air to the car-brakes, also smaller openings connecting with short elastic tubes $a^2$. Fig. 7 illustrates car-couplers locked in horizontal section. Fig. 8 is a perspective view of one head of open car-coupler. Fig. 9 represents a perspective view of draw-head with hook or jaw detached. Fig. 10 is a view of detached hook, showing rear projection or stem $g^6$ and shoulder $j'$, of locking-pin F. Fig. 11 is a section of part of draw-head and locking-pin. Fig. 12 is a side view, with part of the upper movable plate removed, showing notches $e$; and Fig. 13, a section of the device located in the locomotive-cab for directing an air-current to any of the car-couplings, also showing the connection of car-brakes, tube, and the branch tube communicating with groove $c^4$, which is placed in communication with the holes $a$, which lead to the openings 1 2 3 4 5, &c., communicating with the car-couplings. Fig. 14 is a perspective view of lower portion of detached lever, showing location of depression $b'$ in stop-guard $b$ and depending tooth $d'$.

As will be seen, Fig. 1 does not show the larger opening designed for the passage of compressed air to the car-brakes.

A represents the locomotive-cab containing a double plate or device which, through a series of holes $a$, connect with a series of openings $a'$, which may be connected flexibly by tubes $a^2$ for a short distance, thereby allowing the train to make curves without injury to the connections. The new and novel arrangement of the openings $a'$ in the pipe A′ are so placed that should a car be reversed the openings will register with the desired openings on the opposite car, thereby allowing an air-blast directed by the engineer to pursue an unbroken course to its desired destination, thereby operating the couplings of that car. These openings constructed in the larger pipe A′ correspond to the maximum number of cars in the train.

B′ is an air-compressor, and $B^2$ a cylinder or reservoir for compressed air, which is placed on the locomotive, and may be the same that is employed by the air-brakes. From the reservoir (see Figs. 1 and 13) a tube $c$ leads to an annular groove $c'$, which is in communication with air-brake tube $c^2$, said tube communicating with the air-brakes opening in the pipe A′. From the tube $c$ a branch tube $c^3$ leads upward and communicates with an annular groove $c^4$ in plate $c^5$. In conjunction with groove $c^4$ is a stop-guard $b$, Figs. 12 to 14. On one side is formed a depression $b'$. In movable plate $c^6$ there is formed a recess $b^2$, which receives the stop-guard $b$. The said stop-guard has an extending rod which is pivoted to the bell-crank lever $d^2$ at the point $d^3$, the bell-crank terminating in a handle $d^4$, pivoted to the arm $e^3$. The stop-guard $b$ having a depending tooth $d'$, corresponding notches $e$ are set in the lower stationary plate $c^5$, Fig. 12. The depending tooth $d'$ is held normally in said notches by spiral spring $e'$, which is held in position by shoulder $e^2$, forming part of arm $e^3$, which is an extension of movable plate $c^6$. Stationary plate $c^5$ has formed upon it centrally a stud $e^4$, to which movable plate $c^6$ is properly journaled. By moving the arm $e^3$, which is part of movable plate $c^6$, over the stationary plate $c^5$ a current of air from the reservoir may be directed to any one of a series of holes $a$, which is in communication with the openings 1 2 3 4 5, &c., leading to the air-cylinders in the draw-heads, as hereinafter explained.

The pipe-couplings and car-couplings closed are shown in a side elevation of Fig. 2. $A'$ is the large pipe containing the pneumatic openings 1 2 3 4 5, &c., also the larger opening in communication with the car-brakes.

We will now describe the ways and means devised to secure a close coupling of pipe $A'$, reference being had more especially to Figs. 3, 4, 5, and 6. The pipe-heads $A^2$ are reduced on their opposing sides to form contacting faces $C^2$. On the face-plates or faces of pipe-heads (see Fig. 4) is arranged a circular series of holes leading to the openings 1 2 3 4 5, &c. The pipe-heads $A^2$ are of metal terminating in points $A^3$, which are provided with corresponding recesses $A^4$, formed in opposite pipe-heads. Semicircular funnels or flanges $B^2$ are bolted to pipe $A'$. These funnels serve to guide the pipe-heads $A^2$, with their points $A^3$, into the proper receptacles $A^4$ on opposite pipe-heads, thereby allowing springs $A^5$ to enter the small recesses $A^6$, thereby retaining the pipe-heads in a closed position. Pipe $A'$, with the exception of the short elastic connections, is made of metal, the openings 1 2 3 4 5, &c., with the larger opening, being formed as best shown in Fig. 5 in cross-section. These openings are all brought into communication with each other whenever the face-plates $C^2$ of pipe-heads $A^2$ are brought together, the openings of one face-plate registering with those of the other. To secure an air-tight connection, the forward end of pipe $A'$ is cylindrically bored for a short distance, as shown at $D^3$. The cylinder $D^3$ is provided with an internal cylinder or piston head $D^6$, Fig. 6, which is the rear end of pipe-head $A^2$, showing openings $a'$, leading to the small cylinders located on the lower side of the draw-heads, also ports or openings $D'$, intended for the passage of compressed air to the car-brakes.

In Fig. 3 is shown two of the smaller openings $a'$, entering cylinder or chamber $D^3$, connected flexibly by tubes $a^2$, passing said cylinder into pipe-heads $A^2$ and thence passing through and leaving pipe $A'$ and passing to their designated car-couplings. The larger air-brakes opening D is obstructed with a partition $D^5$, directing the flow of air through openings $E'$ into ports or openings $D'$, (on the piston-head $D^6$ or rear end of pipe-head $A^2$,) entering chamber $D^3$, forcing the piston-head $D^6$ outward, thereby carrying points $A^3$ into recesses $A^4$, making a close connection of holes in face-plates $C^2$, at the same time allowing the air to pass from chamber $D^3$ through opposite port or opening $D'$, there entering an opening $E^2$ and thence into the larger opening D through the pipe-heads, striking the opposite partition and pursuing in the opposite head the same course just described, re-entering the air-brakes opening D and passing throughout the train and operating the car-brakes.

If at any time a car should be detached or at the rear end of the train, the pressure of compressed air within the chamber $D^3$, acting upon the rear end of pipe-head or piston-head $D^6$, will throw the said piston-head outward, the partition $E^3$ of said head closing the opening $E'$, thereby automatically cutting off the passage of air. When the pipe-heads are brought together, the points $A^3$ are guided to their corresponding recesses $A^4$ by the funnels $B^2$, surrounding the opposite points. The funnel, as seen in Fig. 4, should be attached to the opposite pipe-head, a small bolt being entered at the holes $B^3$. The compressed air contained within the chamber $D^3$ acts as a cushion when the pipe-heads are forced together. In case they should be forced too far backward or inward, the cylinder sides are provided with shoulders $E^4$, which serve as a protection to the elastic tubes $a^2$. An annular shoulder $E^5$ is formed in the forward end of pipe $A'$; hence corresponding shoulders $E^6$ are formed on piston-head $D^6$ to retain said piston-head in position in the forward end of pipe $A'$. When the pipe-heads $A^2$ are brought together, the said pipe-heads will be forced inward, allowing the compressed air to pass through the openings $E^2$ into the larger opening D, and thence to operate the air-brakes, as will be understood. The pipe $A'$ is constructed of metal and may have a flexible connection. The said pipes are placed directly below the draw-heads with a slight projection, and secured by proper hangers to the said draw-heads and bottom of the cars.

We will now proceed to describe the car-couplings, reference being had more especially to Figs. 7, 8, 9, 10, and 11. The car-coupler is composed of four parts—namely, a hollow draw-head, as seen in Fig. 9, a hook or jaw, Fig. 10, a locking-pin F, Figs. 8 and 10, and a piston-head $f$, terminating in a chair $f'$, which supports locking-pin F. (See section, Fig. 11.) The draw-head $G'$, Fig. 8, has a projection or second head $F'$, which is provided with an opening $g$, forming upper and lower lugs, in which are vertically-aligned openings $g'$, and are to receive a pin which is used in connection with common pin-and-link draw-heads. The large depression $f^2$ is designed to receive second draw-head F' of opposite car. A third opening $f^3$, opposite the second draw-head F', is designed to receive the stem $g^6$ of hook or jaw. The stem or arm $g^6$ terminates in shoulders $g^4$ and $g^5$, formed at the outer edge of plate $h$. Said plate, being reduced in size, forms the semicircular ridges $g^2$. Corresponding channels $g$ are formed in the upper and lower walls of the draw-head to receive the ridges $g^2$. The locking-pin F is of rectangular form provided with an enlarged head $j$ and a reduced lower end, whereby a shoulder $j'$ is formed. If the pin be removed from the aperture $k$, and it is desired to introduce the hook or jaw, Fig. 10, into the opening $f^3$ of the draw-head, Fig. 9, the stem $g^6$ being entered, the ridges $g^2$ enter the channel-ways $g^3$ and slide around into their proper position in the draw-head. If the locking-pin F be inserted in the pin-holes $k$, the reduced end of locking-pin F will pass between the stem and wall of the draw-head into the recess made by shoulder $g^5$ dropping into the smaller aperture $k$, thereby engaging shoulder $g^5$, arresting the outward movement of the jaw. The shoulder $j'$ of the locking-pin is resting upon the plate $h$ of the stem $g^6$, if the coupler be detached. Fig. 8 shows the car-coupler in the described position. If the car-couplers are brought together, the heads F' will enter the large depressions $f^2$, striking the interior of hook or jaws $l$, forcing them inward, allowing locking-pin F to drop into the opening formed by shoulder $g^4$, thereby locking both jaws and forming a double coupling. It will be readily seen that the jaws encircle the second heads. On the bottom of the draw-heads (see Views 2 and 11) we arrange a small cylinder B', which is placed directly below the locking-pin F, the cylinder being provided with a piston-head $f$, terminating in a chair $f'$, which is a support for the lower end of locking-pin F. The cylinder, being of larger dimensions than the lower pin-aperture $k$, forms a shoulder, which limits the upward movement of piston-head $f$, thereby retaining said piston-head in its position within said cylinder. Compressed air being admitted to the cylinder, as indicated by the flying arrows, Fig. 2, through the tube 1, or first, which is provided with a check-valve $p$ above check-valve tube 1, or first, has a branch tube $y$, which leads into pipe A' at the point $o$ and passes through the coupling, leaving the pipe A' at the point $o$ opposite, as indicated by said arrows, re-entering tube last at point $q$, closing check-valves. The air, being confined in described space, enters both cylinders simultaneously, raising the locking-pins, thereby releasing the double coupling.

We will now proceed to describe how the air is admitted from the engine to a designated car-coupling, reference being had more especially to Figs. 1, 2, 12, 13, and 14. By pressing the crank-handle $d^4$ (which is part of the device located on the locomotive for directing an air-current to a desired point) the rod $d$ is drawn outward, disengaging the tooth $d'$ from the notches $e$, drawing the stop-guard $b$ outward. While in this position the wall $b^3$ of the stop-guard covers the groove $c^4$, cutting off the air-current, thereby allowing the movable plate to be set at the fourth opening, we will say, without the escape of air through the other openings passed over. If it be desired to place the air in communication with the couplings of car E, Fig. 1, which is the fourth car, if the crank-handle $d^4$ be disengaged, the spiral spring $e'$ will force the tooth $d'$ into notches $e$, re-entering the stop-guard $b$, the depression $b'$ forming a passage, thereby allowing the compressed air to pass into the opening numbered 4 on the locomotive, into the opening numbered 3 on car B, into the opening numbered 2 on the car C, into the opening numbered 1 on the car D, and through the tube 1, or first, raising the check-valve $p$, passing into the cylinder B', into branch tube $y$, which leads into the pipe A' at the point $o$, passing through the pipe-coupling, leaving the large pipe A' at the point $o$, as indicated by the flying arrows, entering tube 5, or last, at the point $q$, closing the check-valve $p$, simultaneously entering both cylinders B', acting upon piston-heads $f$, lifting locking-pin F, thereby unlocking the double coupling, so that the draw-heads may be withdrawn, separating between the points E and D.

If it is desired to release the couplings between the points D and C, the air is admitted at the opening numbered 3 in the locomotive, passing into opening numbered 2 of car B, into opening numbered 1 of car C, into tube 1, or first, and thence to the car-couplings, operating as above described, disengaging the couplings of the cars D and C. It will be readily seen that should a car be reversed the opening 5, or last, will take the place of 1, or first. Reversed numbers 5 4 3 2 1 will read 1 2 3 4 5, as will be readily understood.

The above couplings thus described, it will be seen that all of the couplings of the cars are brought under the direct control of the engineer, and he can not only in case of reversion couple and uncouple his cars without assistance or leaving his locomotive, but he can in case of an accident detach the couplings of cars from those that may chance to have become derailed, and in case of fire he can scatter the cars of his train, thereby saving a heavy loss to the company.

Although we have not illustrated it, it will be clear to others skilled in the art that openings for transmitting heat or sound may be formed in pipe A', and, if desired, the system of openings may be converted into wires properly insulated with a return-circuit. Thence changing the motive power from air to electricity signal-telephone, telegraph, and electric-light wires may be arranged therein.

Having thus described our invention, what we claim, and desire to secure by Letters Patent, is—

1. In a car-coupling system, channels or openings 1 2 3 4 5, &c., combined together in a larger pipe A′, said channels or openings leading from the locomotive communicating with short tubes 1, or first, and 5, or last, which are connected with the cylinders in the car-couplers, the opening 5 of the locomotive registering with the opening numbered 4 upon the following pipe-head $A^2$ of opposite car, the opening numbered 4 of that car registering with the opening numbered 3 upon the opposite pipe-head $A^2$ of the following car, the opening numbered 3 of that car registering with the opening numbered 2 upon the pipe-head $A^2$ of the next car, the opening numbered 2 of that car registering with the opening numbered 1 upon the opposite pipe-head $A^2$ of the following car, and the opening numbered 1 on that car in communication with tube 1, or first, having check-valves $p$ and leading to the cylinder B′ of car-coupler, substantially as and for the purpose herein described.

2. The channels or tubes 1 2 3 4 5, &c., formed and arranged within pipe A′ on each car, substantially as described, so that if the car should be reversed the opening 5, or last, will take the place of 1, or first, and reversed numbers 5 4 3 2 1 will read 1 2 3 4 5, the maximum number of openings required, corresponding to the number of cars in the train.

3. In combination with the tubes or channels herein described 1 2 3 4 5, &c., a device located in the locomotive-cab for directing an air-current therethrough, consisting of stationary plate $c^5$, having notches $e$, tube $c$, leading to air-brakes, groove $c'$, which communicates with the opening D in pipe A′, a branch tube $c^3$, which leads to groove $c^4$, communicating with holes $a$, leading to tubes or channels 1 2 3 4 5, &c., in pipe A′, in communication with the car-couplers, and said plate $c^5$, having also the stud $e^4$, to which the movable plate $c^6$ is properly journaled, said latter plate having recess $b^2$ in combination with the stop-guard $b$, provided with depression $b'$, the stop-guard having an extending rod $d$, surrounded by spiral spring $e'$, pivoted to the bell-crank lever $d^2$ at the point $d^3$, the bell-crank terminating in a handle or arm $d^4$, which is pivoted to the extending arm $e^3$ of said plate, the stop-guard $b$ having also depending tooth $d'$, which is received by the notches $e$, located in the lower stationary plate $c^5$, substantially as and for the purpose herein described.

4. A pipe-coupling consisting of pipe-heads $A^2$, which are provided with duplicated faces $C^2$, said faces arranged with a circular series of holes $a$, placed around a larger hole D, the said holes being adapted to register with the holes of face-plate of pipe-head $A^2$ of the opposite car, said pipe-heads terminating in points $A^3$, provided with corresponding recesses $A^4$, which are formed in opposite pipe-heads, said heads being provided with semi-circular flanges $B^2$, which have springs $A^5$, which enter the recesses $A^6$, all adapted to operate substantially as shown and described.

5. In combination with a pipe-coupling, pipe-heads $A^2$, ending in piston-heads $D^6$, having ports or openings $D'$, communicating with opening $E'$, the chamber $D^3$, and short elastic tubes passing through said chamber communicating with tubes or channels 1 2 3 4 5, &c., all arranged and operating substantially as specified.

6. The combination, with a railway-car, of the tubes 1, or first, and 5, or last, connecting with the tubes or channels 1, or first, and with 5, or last, in the pipe A′, said tubes provided with check-valves $p$, leading to the cylinders B′, provided with the piston-heads $f$, said piston-heads terminating in chairs $f'$ for the support of locking-pins F, said tubes being provided with branch tubes $y$, substantially as and for the purpose set forth.

7. A car-coupling consisting of the draw-head G′, the second head F′, provided with depression $g$ and vertically-aligned openings $g'$, said second head completing the formation of large depression $f^2$, designed to receive head F′, located on opposite car, the hooks or jaws encircling these second heads of opposite car forming double couplings, substantially as and for the purpose herein described.

8. The combination, in a car-coupler having a hollow draw-head and a second head F′, said draw-head provided with large depression $f^2$ and the socket $f^3$, rectangular pin-apertures $k$, provided with locking-pin F, and the cylinder having the piston-head $f$, terminating in a chair $f'$ for the support of said pin, semicircular channel-ways $g^3$, formed in the upper and lower walls of said draw-head, for the purpose of receiving the ridges $g^2$ of the hook or jaw, said jaw being provided with a stem $g^6$, said stem terminating in the shoulders $g^4$ and $g^5$, shoulder $g^5$ being retained in position on the draw-head G′ by the reduced end of locking-pin F, the shoulder $j'$ of said pin resting upon the plate $h$ when the jaw is in an open position, and when closed the shoulder $g^4$ engaging the larger portion of the locking-pin F, thereby locking the couplers, as herein specified.

9. In combination with the draw-head G′, a cylinder arranged beneath the locking-pin provided with a piston-head $f$, which terminates in a chair $f'$ for the support of said pin, all arranged and operating substantially as set forth.

In testimony whereof we affix our signatures in presence of two witnesses.

ROBT. McWHIRTER.
EUGENE S. SCHEBLE.

Witnesses for McWhirter:
M. C. SYDNOR,
H. E. DUNN.

Witnesses for Scheble:
L. HOLTZDAW,
C. HENRY.